Aug. 25, 1953     J. W. CONDON     2,649,839
PROTECTIVE VISOR FOR MIRRORS
Filed Oct. 24, 1950     2 Sheets-Sheet 1
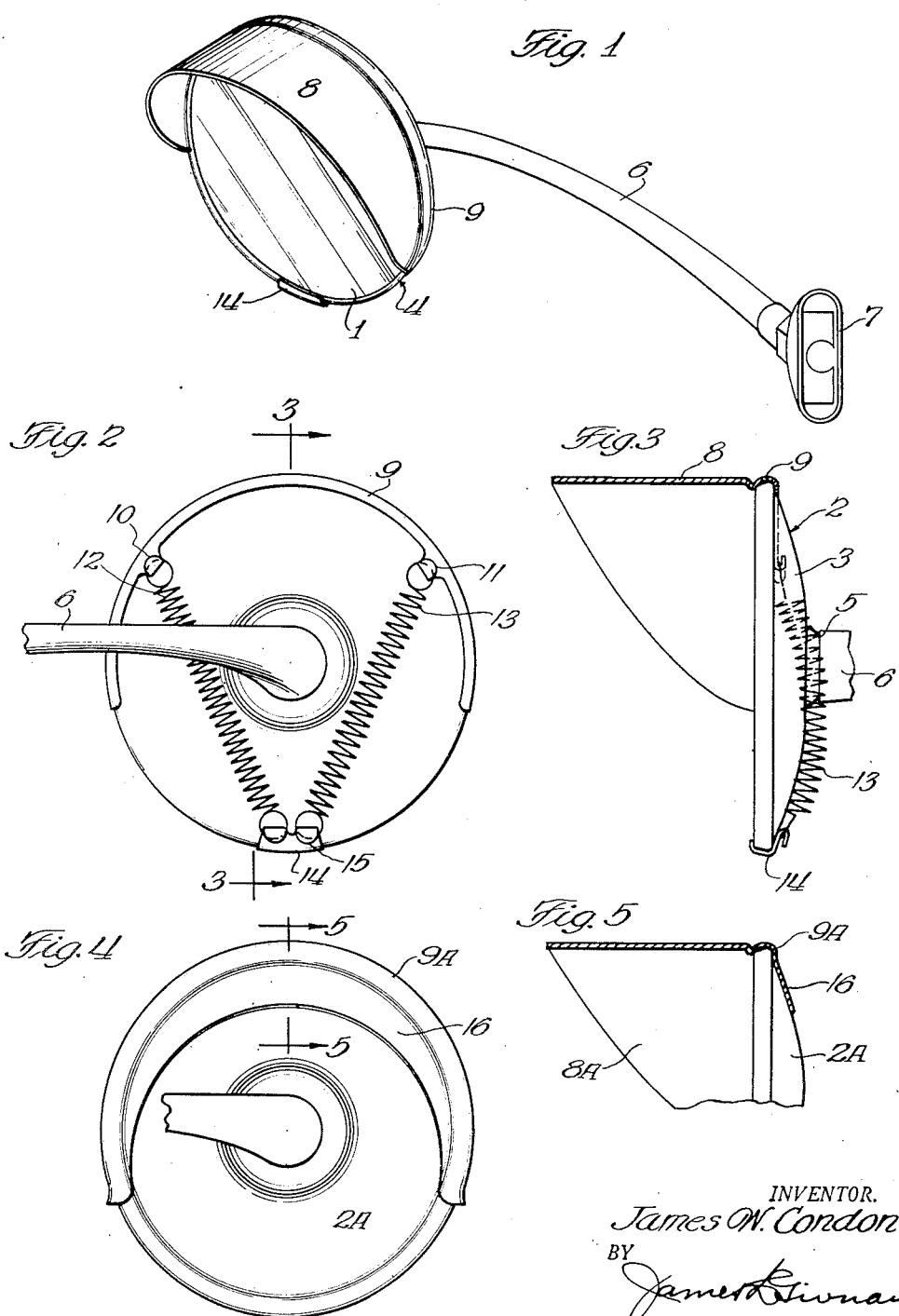
INVENTOR.
James W. Condon
BY
ATTORNEY Aug. 25, 1953  J. W. CONDON  2,649,839
PROTECTIVE VISOR FOR MIRRORS
Filed Oct. 24, 1950  2 Sheets-Sheet 2
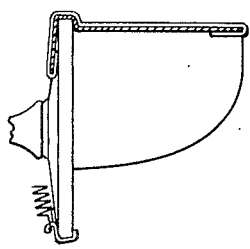
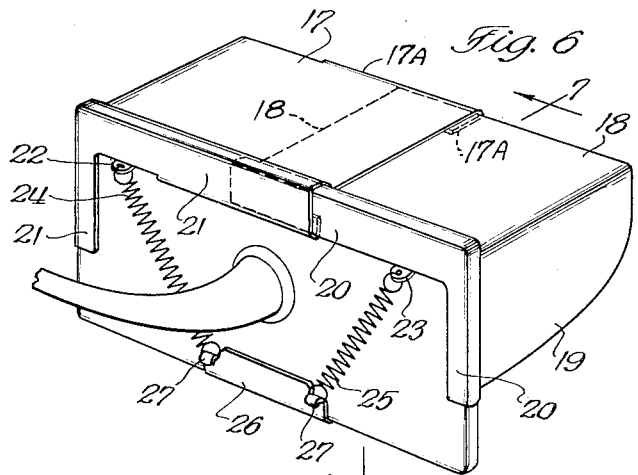
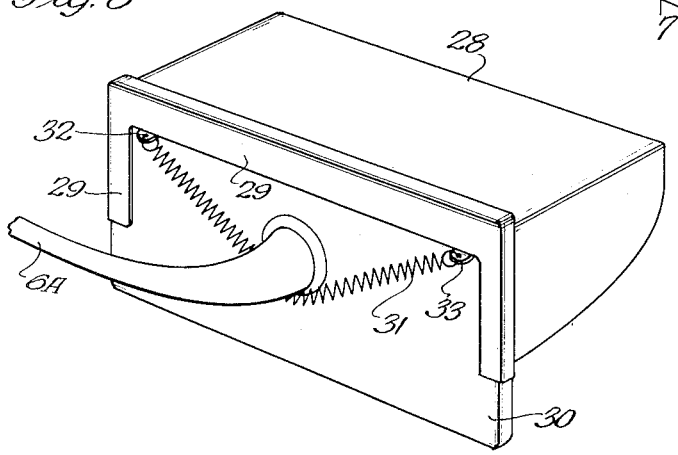
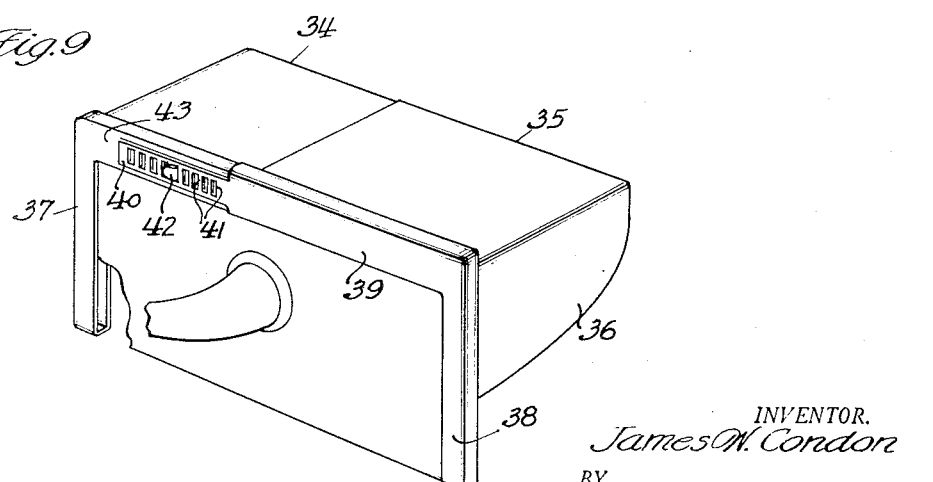
INVENTOR.
James W. Condon
BY
James L. Livman
ATTORNEY Patented Aug. 25, 1953

2,649,839

UNITED STATES PATENT OFFICE 2,649,839

PROTECTIVE VISOR FOR MIRRORS

James W. Condon, The Dalles, Oreg.

Application October 24, 1950, Serial No. 191,781

1 Claim. (Cl. 88—77)

This invention relates to improvements in protective visors for rear-view mirrors, such as are used on the exterior of automobiles, trucks and other vehicles.

It is one of the principal objects of the invention to provide a lightweight, durable and adjustable visor adapted for attachment to mirrors of round, square or rectangular formation to protect the reflecting surface of the mirror from rain, road-splash and the like and also to shadow the mirror to eliminate glare from sunlight.

Another object is the provision of visors of this character which may be inexpensively produced out of sheet metal by simple punching and forming operations, or molded out of plastic, or other suitable material.

These and other objects will appear as my invention is more fully hereinafter described in the following specification, illustrated in the accompanying drawings and finally pointed out in the appended claim.

In the drawings:

Figure 1 is a perspective view of my invention shown applied to a circular mirror.

Figure 2 is a slightly enlarged rear elevation of Figure 1.

Figure 3 is a sectional end elevation taken approximately along the line 3—3 of Figure 2.

Figure 4 is a rear elevation of a modified form of the invention also applied to a circular mirror.

Figure 5 is a sectional detail view taken approximately along the line 5—5 of Figure 4.

Figure 6 is a perspective view of a further modified form of the invention shown applied to a mirror of rectangular formation.

Figure 7 is a sectional end elevation taken approximately along the line 7—7 of Figure 6.

Figures 8 and 9 are perspective views of still further modifications of the invention shown applied to mirrows of rectangular formation.

Referring now more particularly to the drawings:

In Figures 1, 2 and 3, reference numeral 1 indicates a circular mirror mounted within a conventional housing generally indicated at 2 having a back wall 3 flanged as at 4 for securely uniting the mirror with the housing. The housing is adjustably attached in the usual manner by means of a universal joint 5 to a supporting arm or bracket 6 adapted to be secured to the vehicle by any approved form of bracket or fitting as indicated at 7. The visor 8 which may be made of sheet metal or of molded material such as plastic or the like, is shaped as shown and formed with a rim portion 9 of substantial U-shape in cross section for gripping the peripheral flange 4 of the mirror housing 2. At spaced-apart points on the rim 9 I form ears 10 and 11 to which I permanently attach one end of tension springs 12 and 13 respectively whose opposite ends are attached to a clip 14 by means of ears 15 formed integral therewith. I have found it desirable to permanently attach one end of one spring to the clip 14 and provide for removable attachment of the other. By this arrangement the visor 8 may be securely held to the mirror but at the same time may be rotated into any desired adjusted position.

In the modified form of visor indicated at 8A in Figure 5 I dispense with the springs 12 and 13 and the clip 14 by extending the rim portion 9A of the visor inwardly to form a flange 16 which is adapted for sprung engagement with the rear surface 2A of the mirror housing.

The form of visor shown in Figures 6 and 7 is made in two sections 17 and 18 each having a horizontal portion and a downwardly extending end wall 19 and channel portions 20 and 21, by means of which the two sections may be adjustably attached to a mirror of rectangular formation. An extended marginal portion 17A of the section 17 is folded under itself to grip the outer edge of the horizontal portion of section 18 to stabilize both sections. A portion of the outside vertical wall of the channel in section 17 is folded over on itself to grip the corresponding wall of the channel in section 18. Formed integral with each section is an ear 22 and 23 to which I permanently attach one end of springs 24 and 25 whose opposite ends are attached to a clip 26 embracing the bottom edge of the mirror housing and formed with ears 27. One end of one spring is permanently attached to said clip and the other removably attached thereto. By this arrangement the two horizontal sections and their respective channels are securely held in assembled relation to each other and their respective channel members are securely held to the mirror housing.

The form of visor indicated at 28 in Figure 8 is not adjustable and is made of a single piece of material formed with a channel section 29 adapted to embrace the top and side edges of a mirror housing indicated at 30. This visor is securely held onto the mirror housing by means of a spring 31 whose one end is permanently attached to the visor by means of an ear 32 and whose opposite end may be removably attached to a similar ear 33. The spring extends below and pulls against the under side of the mirror bracket 6A, or a clip may be provided to engage the mirror housing as in the other forms of the invention if desired.

The form of visor illustrated in Figure 9 is made in two sections indicated at 34 and 35 having horizontal portions and downwardly extending end walls 36. Each section is formed with a channel 37 and 38, respectively, adapted to telescope one within the other as shown for adjusting the sections with respect to each other for attachment to a mirror housing. For locking said sections together and into engagement with said mirror housing I form the outside wall 39 of the channel 38 with an extension 40 which is formed with spaced-apart apertures 41 to receive a locking tongue 42 extending outwardly from the outside wall 43 of the channel 37. In some instances it may be desirable to leave the bottom ends of the channels 37 and 38 open so that the channels may accommodate themselves to mirror housings of various heights.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A protective visor attachment for a mirror mounted within a vertically disposed housing having top, side and bottom edges, said visor attachment comprising in combination two telescopic sections of channel formation in cross section adapted to engage the top and side edges of the mirror housing, each section having a horizontal top portion and a downwardly extending end wall, a clip adapted for removable attachment to the bottom edge of said mirror housing, a pair of diverged tension springs interconnecting the ends of said clip and the corner portions of said telescopic sections whereby said sections will be urged downwardly and inwardly into locked engagement with the housing.

JAMES W. CONDON.

References Cited in the file of this patent

UNITED STATES PATENTS

| Number | Name | Date |
|---|---|---|
| 1,808,642 | Duffy | June 2, 1931 |
| 1,905,868 | Hein | Apr. 25, 1933 |
| 2,098,843 | Watrous | Nov. 9, 1937 |
| 2,442,504 | Miller | June 1, 1948 |

FOREIGN PATENTS

| Number | Country | Date |
|---|---|---|
| 212,098 | Great Britain | Mar. 6, 1924 |
| 418,684 | Great Britain | Oct. 30, 1934 |